(12) United States Patent
Nishiura et al.

(10) Patent No.: US 9,530,446 B2
(45) Date of Patent: Dec. 27, 2016

(54) INFORMATION RECORDING APPARATUS, INFORMATION RECORDING METHOD, INFORMATION REPRODUCING APPARATUS, AND INFORMATION REPRODUCING METHOD

(71) Applicant: Hitachi-LG Data Storage, Inc., Minato-ku, Tokyo (JP)

(72) Inventors: Hiromi Nishiura, Tokyo (JP); Tatsuya Ishitobi, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 14/598,646

(22) Filed: Jan. 16, 2015

(65) Prior Publication Data
US 2015/0206551 A1 Jul. 23, 2015

(30) Foreign Application Priority Data
Jan. 20, 2014 (JP) .................... 2014-007430

(51) Int. Cl.
G11B 7/085 (2006.01)
G11B 7/0045 (2006.01)
G11B 7/007 (2006.01)
G11B 7/08 (2006.01)

(52) U.S. Cl.
CPC ......... G11B 7/0045 (2013.01); G11B 7/00736 (2013.01); G11B 7/00781 (2013.01); G11B 7/083 (2013.01); G11B 7/085 (2013.01)

(58) Field of Classification Search
CPC . G11B 7/00736; G11B 7/00781; G11B 7/085; G11B 7/004; G11B 7/0045; G11B 7/083

USPC ............ 369/53.2, 53.24, 30.01, 30.1, 47.47, 369/47.54, 53.23, 53.28, 44.26
See application file for complete search history.

(56) References Cited

U.S. PATENT DOCUMENTS

| | | | | |
|---|---|---|---|---|
| 6,185,058 B1 * | 2/2001 | Dobbek | ............ | G11B 20/1217 360/48 |
| 7,106,542 B1 * | 9/2006 | Sun | .................... | G11B 5/59627 360/75 |
| 2004/0190407 A1 * | 9/2004 | Nobukuni | .............. | G11B 7/006 369/47.1 |
| 2005/0111344 A1 * | 5/2005 | Yamanaka | ......... | G11B 7/00718 369/275.4 |
| 2006/0198265 A1 * | 9/2006 | Sasaki | ................. | G11B 7/0045 369/53.24 |
| 2008/0037403 A1 * | 2/2008 | Yoshida | ............. | G11B 20/1883 369/275.1 |
| 2008/0080335 A1 | 4/2008 | Matsumoto et al. | | |

(Continued)

FOREIGN PATENT DOCUMENTS

JP 2008-84486 A 4/2008

*Primary Examiner* — Thomas Alunkal
(74) *Attorney, Agent, or Firm* — Mattingly & Malur, PC

(57) ABSTRACT

An information recording apparatus for an optical information disk includes a recording position determining unit that determines a recording position on the optical information disk; and a recording and reproducing unit that performs recording and reproduction on the optical information disk. The recording position determining unit determines recording positions for all or some areas of the optical information disk, and the recording and reproducing unit records data at the recording positions on the optical information disk determined by the recording position determining unit.

15 Claims, 11 Drawing Sheets

(56) References Cited

U.S. PATENT DOCUMENTS

| | | | |
|---|---|---|---|
| 2009/0040914 A1* | 2/2009 | Yoshida | G11B 20/1217 369/275.3 |
| 2011/0007616 A1* | 1/2011 | Yamaoka | G11B 7/00736 369/47.51 |
| 2012/0113775 A1* | 5/2012 | Horigome | G11B 7/0901 369/44.14 |
| 2012/0300601 A1* | 11/2012 | Saito | G11B 7/24038 369/44.14 |

* cited by examiner

| ADDRESS | COORDINATE (ABSOLUTE VALUE) |
|---|---|
| A1 | $\theta_1$ |
| A2 | $\theta_2$ |
| A3 | $\theta_3$ |
| A4 | $\theta_4$ |

| ADDRESS | COORDINATE (RELATIVE VALUE) |
|---|---|
| A1 | $\theta_{pitch1}$ |
| A2 | $\theta_{pitch2}$ |
| A3 | $\theta_{pitch3}$ |
| A4 | $\theta_{pitch4}$ |

| START POSITION | $\theta_{start}$ |
|---|---|
| INTERVAL | $\theta_{pitch}$ |
| NUMBER OF POSITIONS | 4 |

| ADDRESS | COORDINATE | |
|---|---|---|
| | RADIUS | ANGLE |
| A1 | R1 | $\theta 1$ |
| A2 | R2 | $\theta 2$ |
| A3 | R3 | $\theta 3$ |
| ⋮ | ⋮ | ⋮ |
| B4 | R8 | $\theta 8$ |

| ADDRESS | COORDINATE | |
|---|---|---|
| | RADIUS | ANGLE |
| A1 | R1 | 0 |
| A2 | R1 | $\theta a$ |
| A3 | R1 | $2\theta a$ |
| ⋮ | ⋮ | ⋮ |
| B1 | R2 | 0 |
| B2 | R2 | $\theta b$ |
| ⋮ | ⋮ | ⋮ |

FIG. 8A

| RECORDING POSITION FORMAT (TRACK) | CODE |
|---|---|
| FIXED INTERVAL | 0000 |
| VARIABLE INTERVAL | 0001 |

FIG. 8B

| RECORDING POSITION FORMAT (ROTATION) | CODE |
|---|---|
| FIXED INTERVAL | 0100 |
| VARIABLE INTERVAL | 0101 |

FIG. 8C

| RECORDING POSITION FORMAT (MULTIPLEXING) | CODE |
|---|---|
| FIXED INTERVAL | 1100 |
| VARIABLE INTERVAL | 1101 |

FIG. 8D

| RECORDING POSITION FORMAT (TRACK) | CODE |
|---|---|
| Type1 | 0000 |
| Type2 | 0001 |

FIG. 11

| POSITION FORMAT | CODE |
|---|---|
| Type1 | 000 |
| Type2 | 001 |
| Type3 | 010 |

INFORMATION RECORDING APPARATUS, INFORMATION RECORDING METHOD, INFORMATION REPRODUCING APPARATUS, AND INFORMATION REPRODUCING METHOD

CROSS-REFERENCE TO RELATED APPLICATION

This application claims the priority of Japanese Patent Application No. 2014-007430 filed Jan. 20, 2014, which is incorporated herein by reference in its entirety.

BACKGROUND OF THE INVENTION

1. Field of the Invention

The present invention relates to an apparatus and a method that record information on an information disk or reproduce the information from the information disk. More particularly, the present invention relates to an apparatus and a method that record and reproduce information on/from an information disk using holography.

2. Description of the Related Art

For holographic recording techniques, there is JP 2008-84486 (Patent Literature 1), for example. This publication describes that "A servo layer 5 includes a phase-change layer as will be described later, and the phase-change layer has servo information recorded therein as phase changes ((changes between crystalline and amorphous phases). In other words, the servo layer 5 has servo information recorded therein as changes in reflectivity with respect to a servo optical beam, i.e., changes in reflectivity that can only be determined by irradiation with a servo optical beam, which are caused by phase changes in the phase-change layer. The servo information includes information for performing a servo (particularly, a tracking servo) in an optical recording and reproducing apparatus and address information, and is recorded in the servo layer 5 in the form of servo marks or servo tracks made by phase changes in the phase-change layer."

SUMMARY OF THE INVENTION

In the case of a disk provided with a servo layer such as that described in Patent Literature 1, a position where data is to be recorded or reproduced can be identified using address information obtained from the servo layer.

However, a disk not provided with a servo layer cannot obtain address information from the servo layer and thus requires special consideration to perform recording and reproduction of data by address specification.

An object of the present invention is therefore to provide an information recording and reproducing apparatus and an information recording and reproducing method that allow recording and reproduction of data by address specification even if a disk is not provided with a servo layer (hereinafter, referred to as a servo-layerless disk).

The above-described problem is solved by, for example, a recording position determining unit determining recording positions and recording data at the determined recording positions on an optical information disk.

According to the present invention, an information recording and reproducing apparatus and an information recording and reproducing method can be provided that allow recording and reproduction of data by address specification even if the disk is a servo-layerless disk.

BRIEF DESCRIPTION OF THE DRAWINGS

FIG. 8A is a schematic diagram of a table of correspondence between recording position formats regarding track and codes;

FIG. 8B is a schematic diagram of a table of correspondence between recording position formats regarding rotation and codes;

FIG. 8C is a schematic diagram of a table of correspondence between recording position formats regarding multiplexing and codes;

FIG. 8D is a schematic diagram of a table of correspondence between recording position formats regarding track and codes;

FIG. 11 is a schematic diagram of a table of correspondence between recording position formats and codes.

DESCRIPTION OF THE PREFERRED EMBODIMENTS

According to the embodiments, even if the disk is a servo-layerless disk, the recording and reproduction of data by address specification can be performed. The servo-layerless disk can identify positions on the disk by coordinates using a specific point on the disk as the origin, but addresses indicating data recording positions are not predetermined. In the embodiments, the recording and reproduction of data by address specification are implemented by associating addresses with their corresponding coordinates on the disk.

The embodiments of the present invention will be described below. All embodiments can be implemented using an apparatus shown in FIG. 6. First, the basic operation of an information recording and reproducing apparatus according to the embodiments will be described using FIG. 6 and then each embodiment will be described in detail.

Figure 6:
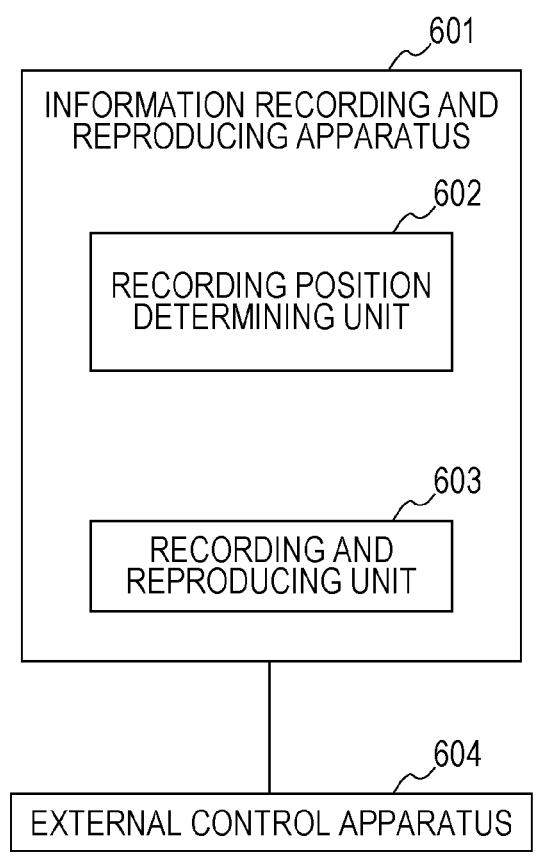
FIG. 6 is a schematic diagram showing an embodiment of an information recording and reproducing apparatus.

FIG. 6 is a block diagram showing an information recording and reproducing apparatus. An information recording and reproducing apparatus 601 includes a recording position determining unit 602 and a recording and reproducing unit 603. When the information recording and reproducing apparatus 601 receives an operation instruction, such as recording or reproduction of data, from an external control apparatus 604, the information recording and reproducing apparatus 601 controls recording or reproduction of data at specified addresses. The recording position determining unit 602 determines specific coordinates on a disk as recording positions, using recording position intervals, etc., which are directly or indirectly specified by the external control apparatus 604, and provides addresses to the recording positions. The recording and reproducing unit 603 obtains from the recording position determining unit 602 the coordinates of recording positions associated with addresses specified by the external control apparatus 604, and records data at the coordinates. The recording position determining unit 602 can be implemented by a program controlled by a microcomputer or a CPU.

First Embodiment

An embodiment of a recording method according to the present invention will be described. A method will be described in which, when data is recorded on a servo-layerless disk, recording positions for recording the data are determined at arbitrary coordinates and the data is recorded. It will be then described that by this method the recording and reproduction of data by address specification can be performed on the servo-layerless disk.

Figures 3A, 3B:
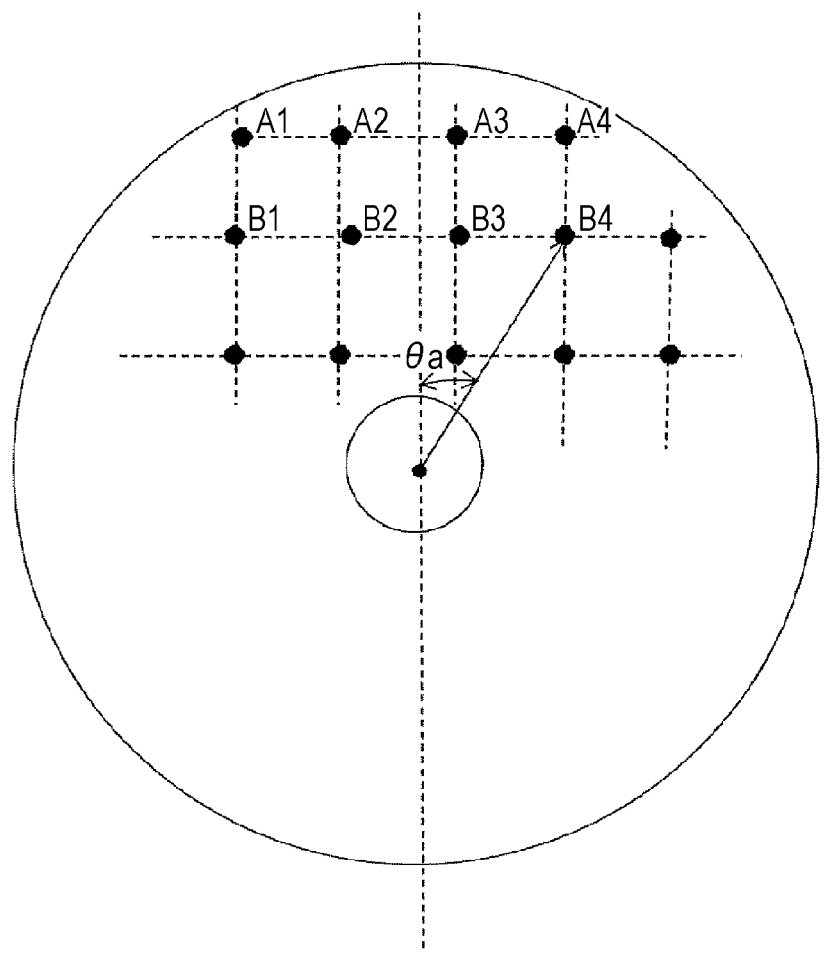
FIG. 3A is a schematic diagram of data recording positions on a disk.
FIG. 3B is a schematic diagram of correspondence between addresses and coordinates.
Figures 4A, 4B:
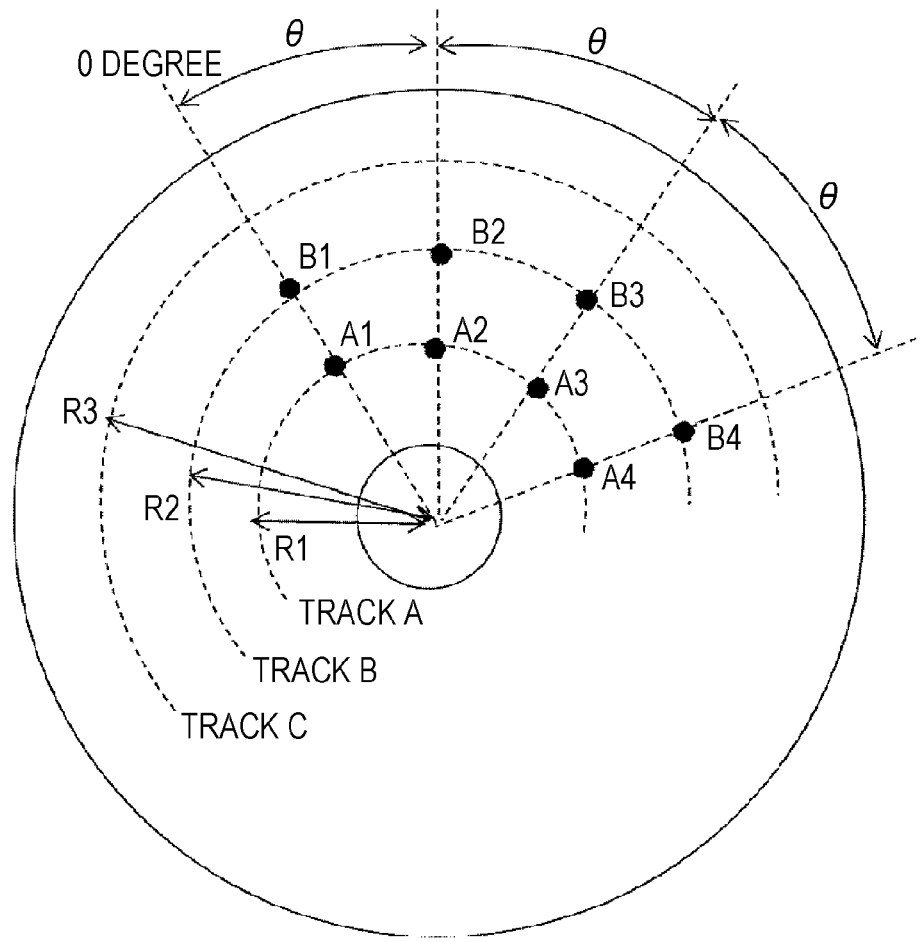
FIG. 4A is a schematic diagram of data recording positions on a disk.
FIG. 4B is a schematic diagram of correspondence between addresses and coordinates.
Figures 5A, 5B:
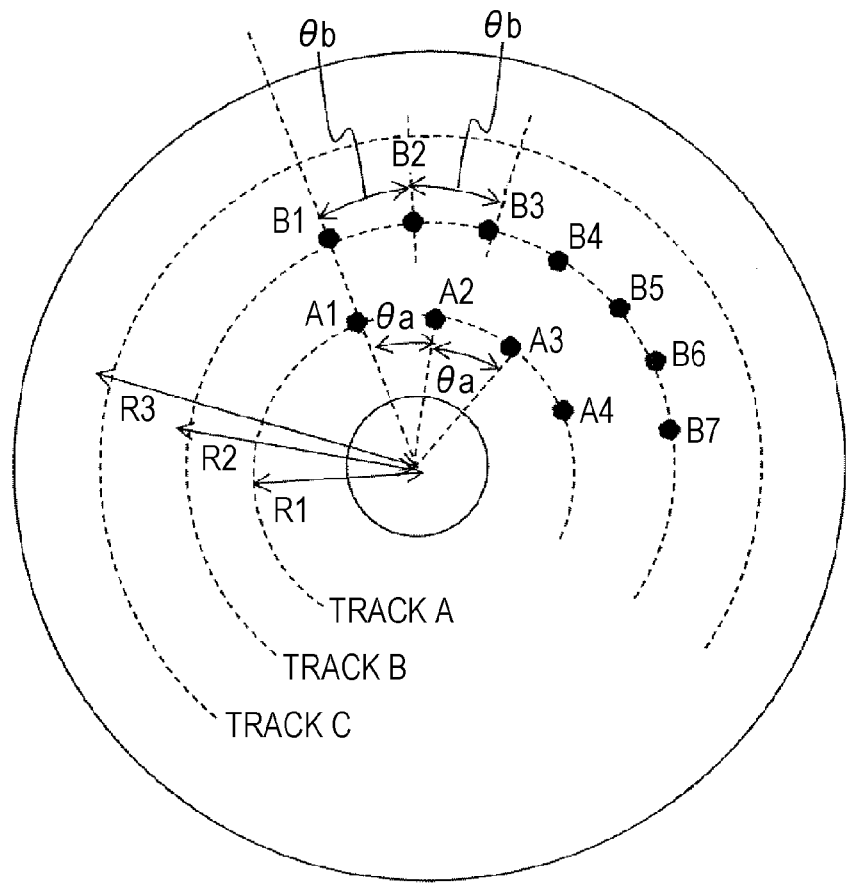
FIG. 5A is a schematic diagram of data recording positions on a disk.
FIG. 5B is a schematic diagram of correspondence between addresses and coordinates.

In the recording method according to the present embodiment, first, recording positions for recording data are determined at arbitrary coordinates on a disk, and unique addresses are provided to the recording positions. FIGS. 3A, 4A, and 5A show exemplary disposition of recording positions on a servo-layerless disk. In all of the drawings, a black dot indicates a disposed recording position, and a sign which is a combination of an alphabet and a number, such as A1 or A2, provided to each recording position indicates a unique address assigned to the recording position.

FIG. 3A shows an example in which imaginary lines are drawn on a disk at regular intervals in a horizontal direction and a vertical direction, a point at which imaginary lines in the horizontal and vertical directions intersect is determined as a data recording position, and an address is provided to each recording position.

FIG. 4A shows an example in which imaginary tracks which are circles concentric with a disk are disposed at regular intervals in a radius direction of the disk, imaginary lines are further drawn radially from the center of the disk, the point of intersection of each radial imaginary line and each imaginary track is determined as a data recording position, and an address is provided to each recording position. Here, the intervals between the imaginary lines drawn radially from the center of the disk may be predetermined by the specifications of the information recording and reproducing apparatus 601, or the external control apparatus 604 or the information recording and reproducing apparatus 601 may be allowed to specify any interval.

FIG. 5A shows an example in which imaginary tracks which are circles concentric with a disk are disposed at regular intervals in a radius direction of the disk, data recording positions are determined at regular intervals on each imaginary track, and an address is provided to each recording position. Here, the intervals between adjacent recording positions may be predetermined by the specifications of the information recording and reproducing apparatus 601, or the external control apparatus 604 or the information recording and reproducing apparatus 601 may be allowed to specify any interval. In FIG. 5A, the disk also includes different intervals between adjacent recoding positions.

In all of the examples, an address provided to a recording position is converted to coordinates including a radius (R) which is the distance from the center of the disk and a rotation angle (θ) on the disk, by which a specific position on the disk is identified. In the present embodiment, by generating recording position information indicating correspondence between addresses and coordinates such as those shown in FIGS. 3B, 4B, and 5B, conversion from an address to coordinates on the disk is implemented. By the generation of such recording position information, the address definition for recording positions is attained. By generating such recording position information before recording data on the disk, an address to be specified upon recording or reproduction of data is replaced with specific coordinates. Thus, even if the disk is a servo-layerless disk, recording and reproduction of data using addresses can be performed without inconsistency.

Note that the addresses such as A1 and A2 provided to recording positions in the above-described examples are an example and thus there is no problem even if a unique integer is provided as an address to each recording position.

Although exemplary disposition of recording positions in three different formats is shown above, the determination and management of recording positions can be efficiently performed by predetermining a plurality of disposition formats and providing codes for identifying the formats to the disposition formats, respectively. For example, as shown in FIG. 11, a recording position format such as that of FIG. 3A is set as Type1 and represented by the code "000" to identify the recording position format, a recording position format such as that of FIG. 4A is set as Type2 and represented by the code "001", and a recording position format such as that of FIG. 5A is set as Type3 and represented by the code "010". Then, the identification codes are generated as recording position format information.

By thus using the recording position format information and the recording position information, recording positions are defined at arbitrary positions, addresses are provided to the defined recording positions, and furthermore, the addresses and coordinates on the disk are associated with other, enabling to perform recording and reproduction of data by address specification on a servo-layerless disk.

Second Embodiment

It will be described that by a recording position management method of the present embodiment, when the recording position intervals in a rotation direction on a disk differ from each other, recording positions can be securely identified, and thus, compatibility between information recording and reproducing apparatuses is achieved.

Figures 1A, 1B, 1C:
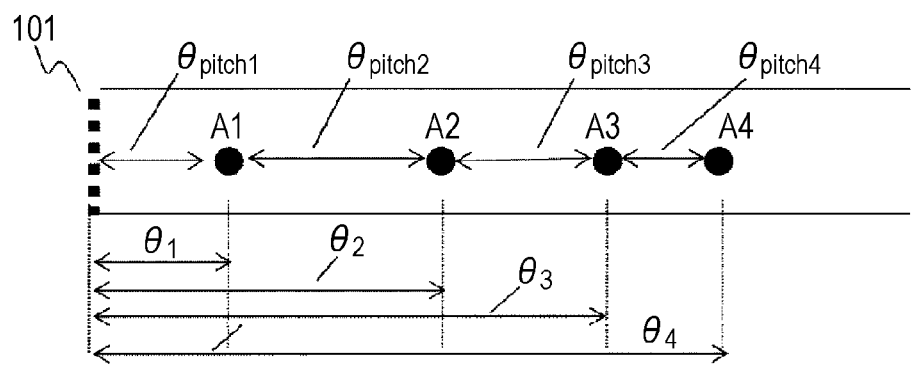
FIG. 1A a schematic diagram of data recording positions on a disk.
FIG. 1B is a schematic diagram of correspondence between addresses and coordinates.
FIG. 1C is a schematic diagram of correspondence between addresses and coordinates.

FIG. 1A shows that the coordinates of recording positions for recording data are defined in a rotation direction on a disk and addresses are provided to the recording positions, respectively. A recording management procedure will be described below for the case of performing recording such that the intervals between recording positions differ from each other, such as those shown in FIG. 1A.

When the information recording and reproducing apparatus 601 receives a recording instruction from the external control apparatus 604, the recording position determining unit 602 defines, one by one, recording positions by coordinates having predetermined intervals therebetween from a reference position which is determined by the specifications of the disk or the specifications of the information recording and reproducing apparatus 601, and assigns unique addresses to the defined recording positions, respectively. FIG. 1A shows an example thereof and shows that first to fourth recording positions are defined one by one and unique addresses (A1 to A4) are assigned to the recording positions, respectively. The recording position determining unit 602 implements association between the coordinates of the recording positions and the addresses shown in FIG. 1A by, for example, generation and holding of recording position information shown in FIG. 1B or 1C. FIG. 1B shows recording position information in a format in which the coordinates ($\theta_1$ to $\theta_4$) of recording positions using a reference position 101 on the disk as the origin are associated with addresses (A1 to A4). FIG. 1C shows recording position information in a format in which the relative coordinates ($\theta_{pitch1}$ to $\theta_{pitch4}$) of recording positions using the reference position 101 or an immediately preceding recording position as the origin are associated with addresses (A1 to A4). The recording position information in either format allows to identify a coordinate on the disk from an address. However, when the coordinate has a relative value such as that shown in FIG. 1C, the effect of reducing the amount of information about coordinates is expected over the case of absolute values shown in FIG. 1B.

In addition, in order to indicate that the intervals between recording positions are irregular, the recording position determining unit 602 determines a format in which the intervals between recording positions in the rotation direction are varying, as a recording position format in the rotation direction. For the recording position format information, for example, the varying interval code "0101" shown in FIG. 8B is generated and held.

The recording and reproducing unit 603 performs recording at coordinates associated with addresses specified by the external control apparatus 604, based on the recording position information generated by the recording position determining unit 602. Along with this, the recording and reproducing unit 603 records the determined recording position format in the rotation direction at a first predetermined position on the disk and records the determined recording position information at the first or second predetermined position on the disk.

By thus making the recording position intervals varying, for example, to extend the recording position intervals, crosstalk at recording portions is reduced and thus high-quality recording can be performed, or recording can be performed avoiding defective areas on the disk.

For the recording position intervals, when a recording instruction is provided from the external control apparatus 604, a recording mode may be specified and intervals according to the mode may be used, or the external control apparatus 604 may specify the recording position intervals.

Upon reproduction, the recording position determining unit 602 reads the first predetermined position on the disk through the recording and reproducing unit 603 and reproduces a recording position format in the rotation direction. In this example, the recording position determining unit 602 reads the code "0101" and thereby obtains a format in which the intervals between adjacent recording positions in the rotation direction are varying. Furthermore, the recording position determining unit 602 reads the recording position information present at the first predetermined position or the second predetermined position through the recording and reproducing unit 603 and thereby obtains the position information shown in FIG. 1B or 1C. By this, the recording position determining unit 602 recognizes correspondence between the coordinates of the respective recording positions defined on the disk and the addresses.

As described above, according to the present embodiment, recording positions in the rotation direction are determined at arbitrary positions, and then, recording is performed and the recording positions can be managed. In addition, since recording position format information or/and recording position information is/are recorded at the first predetermined position or/and the second predetermined position, by reading the information, even when the disk is taken out once or when a different information recording and reproducing apparatus is used, the coordinates associated with the addresses can be obtained and thus the recorded data can be reproduced.

In this example, recording positions specified by the external control apparatus 604 are determined first and then a recording position format is determined. However, a recording position format specified by the external control apparatus 604 may be determined first, and then, recording positions may be determined according to the determined format and then recording position information may be generated.

Alternatively, upon starting recording on an unrecorded disk, all recording position formats and all recording positions may be determined and recording position information for the entire surface of the disk may be generated. At this time, recording is sequentially performed at coordinates associated with addresses generated in response to a recording instruction from the external control apparatus 604.

Alternatively, a recording position format for recording positions in some areas instead of for all recording positions and the recording positions in some areas may be determined and then recording position information may be generated. At this time, when recording is performed, in response to a recording instruction from the external control apparatus 604, at an address in an area whose recording position has been determined, the recording is performed using the generated recording position information. When recording is performed at an address whose recording position has not been determined, a recording position format and recording positions for the next area are newly determined and then recording position information is generated and thereafter the recording can be performed by the same method.

Figure 10:
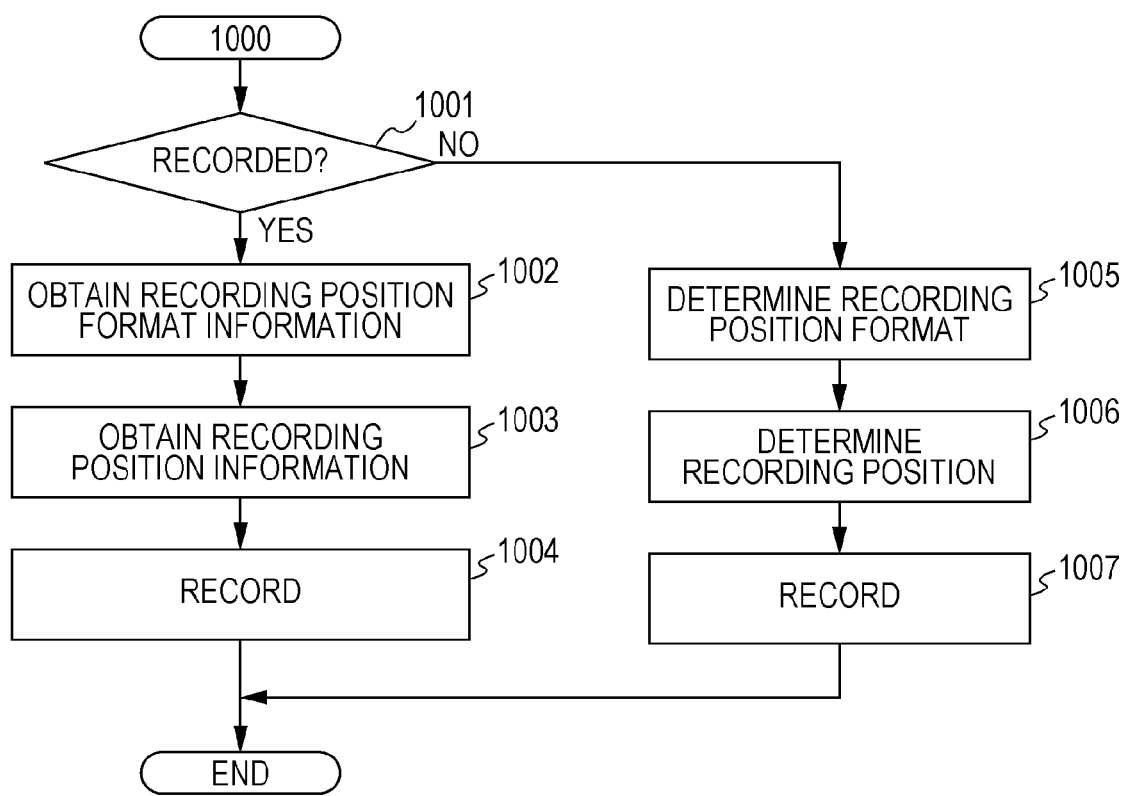
FIG. 10 is a schematic diagram of a flow for recording.

A flow for recording is shown in FIG. 10. At step 1001, it is determined whether recording position format information and recording position information are recorded on a disk. If recorded, processing proceeds to step 1002. If not recorded, processing proceeds to step 1005.

At step 1002, the recorded recording position format information is obtained. At step 1003, the recording position information is obtained. At step 1004, data is recorded using the obtained recording position information.

At step 1005, a recording position format is determined for all or some recordable areas of the disk. The target areas may be instructed by the external control apparatus 604 or may be set by the information recording and reproducing apparatus 601. Then, at step 1006, all or some recording positions are determined for the determined areas. At step 1007, data is recorded at the determined recording positions. In addition, for example, in reproduction control for when recording position format information and recording position information are recorded, reproduction can be performed at step 1007.

If it is determined at step 1001 that the pieces of information are recorded, recording is performed using the pieces of information about a recording position format and recording positions which are obtained at steps 1002 and 1003. However, for example, when the disk is rewritable, those pieces of information may be discarded and a recording position format and/or recording positions may be redetermined newly from step 1005. In the case of redetermination, recording position format information about a new recording position format and recording position information are overwritten at predetermined positions.

According to the above-described embodiment, when the recording position intervals in the rotation direction on the disk differ from each other, recording positions can be securely identified, and thus, compatibility between information recording and reproducing apparatuses is achieved.

Third Embodiment

It will be described using FIGS. 2A and 2B that by a recording position management method according to the present embodiment, when the recording position intervals in a rotation direction on a disk are constant, recording positions can be securely identified, and thus, compatibility between information recording and reproducing apparatuses is achieved.

Figures 2A, 2B:
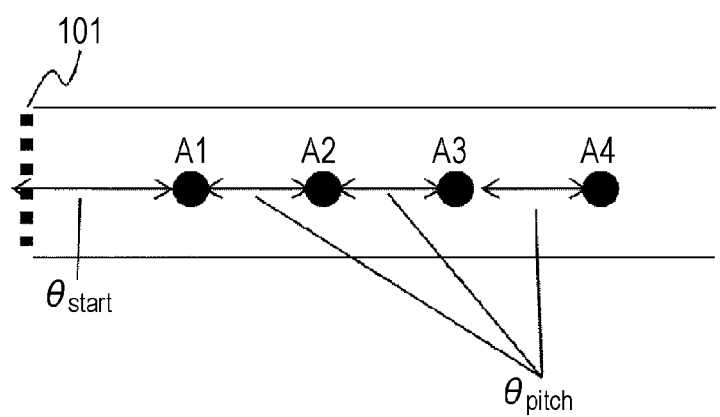
FIG. 2A is a schematic diagram of data recording positions on a disk.
FIG. 2B is a schematic diagram of information about the recording positions.

FIG. 2A shows an example in which four recording positions for recording data are disposed at regular intervals in a rotation direction on a disk and unique addresses (A1 to A4) are provided to the recording positions, respectively. FIG. 2B shows recording position information where the addresses (A1 to A4) of the recording positions shown in FIG. 2A are associated with coordinates. The information includes three pieces of information, a start position, an interval, and the number of positions which respectively indicate the distance from a reference position 101 on the disk, the distance between recording positions, and the number of recording positions. The coordinate $\theta_{start}$ of the start position is associated with the address A1, and a coordinate associated with each address An (n is an integer) after the address A2 can be identified by adding a value, which is obtained by multiplying an interval $\theta_{pitch}$ by (n−1), to the coordinate $\theta_{start}$ of the start position.

A procedure will be described below for the case in which the information recording and reproducing apparatus 601 shown in FIG. 6 performs recording and reproduction of data in the disposition of recording positions shown in FIG. 2A. The external control apparatus 604 specifies a recording mode and provides a recording instruction to the information recording and reproducing apparatus 601. When the information recording and reproducing apparatus 601 receives from the external control apparatus 604 the recording instruction in the recording mode in which the intervals between recording positions are regular intervals, the recording position determining unit 602 sets, as a recording position, a coordinate spaced $\theta_{start}$ from a reference position 101 which is determined by the specifications of the disk or the specification of the information recording and reproducing apparatus 601, and assigns an address A1 to the recording position. Subsequent recording positions are disposed every $\theta_{pitch}$ using the recording position provided with the address A1 as a starting point, and are sequentially provided with addresses A2, A3, and A4 in this order. Then, recording position information shown in FIG. 2B is generated and held. In addition, the recording position determining unit 602 determines a format in which the intervals between recording positions in the rotation direction are constant, as a recording position format indicating that the intervals between adjacent recording positions are regular intervals. For the recording position format information, for example, the constant interval code "0100" shown in FIG. 8B is generated and held.

The recording and reproducing unit 603 performs recording at coordinates associated with addresses specified by the external control apparatus 604, based on the recording position information generated by the recording position determining unit 602. After performing recording at the generated recording positions, the recording and reproducing unit 603 records the determined recording position format information in the rotation direction at a first predetermined position on the disk and records the determined recording position information at the first and/or second predetermined position(s) on the disk.

Upon reproduction, the recording position determining unit 602 reproduces the first predetermined position on the disk through the recording and reproducing unit 603 and thereby obtains the recording position format information in the rotation direction. In this example, the recording position determining unit 602 reads the code "0100" and thereby obtains a format in which the intervals between adjacent recording positions in the rotation direction are constant. The recording position determining unit 602 reads the recording position information present at the first predetermined position or the second predetermined position through the recording and reproducing unit 603 and thereby obtains the position information shown in FIG. 2B. By this, the information recording and reproducing apparatus 601 can reproduce data at coordinates associated with addresses specified by the external control apparatus 604.

When, as shown in FIG. 2A, the intervals between adjacent recording positions are the same, the amount of information held as recording position information can be reduced compared to the case in which the intervals between adjacent recording positions differ from each other such as those in FIG. 1A.

As described above, according to the present embodiment, recording positions in the rotation direction are determined at arbitrary positions, and then, recording is performed and the recording positions can be managed. In addition, since recording position format information or/and recording position information is/are recorded at the first predetermined position or/and the second predetermined position, by reading the information, even when the disk is taken out once or when a different information recording and reproducing apparatus is used, the coordinates associated with the addresses can be obtained and thus the recorded data can be reproduced.

The second and third embodiments show the case in which the intervals between adjacent recording positions in the rotation direction of the disk differ from each other and the case in which the intervals are constant. The second and third embodiments can also be applied to a reference beam angle management method used when recording is performed by performing angular multiplexing between adjacent recording positions in the radius direction or the same location.

Fourth Embodiment

It will be described that recording position information according to the present embodiment can be compressed by using recording position format information according to the present embodiment.

FIGS. 8A to 8C show recording position formats for a track direction, a rotation direction, and a multiplexing direction. In this example, each type is represented by a 4-bit code. The upper two bits represent the attribute "track direction", "rotation direction", or "multiplexing direction", and the lower two bits represent an attribute indicating whether the intervals are constant or varying. Information about the multiplexing direction is, for example, information on the intervals between reference beam angles. In addition, as shown in FIG. 8D, instead of the attribute indicating whether the intervals are constant or varying, for example, when the intervals in the track direction differ from each other, a plurality of pieces of "type" information may be recorded as recording position format information, using the track intervals as an attribute. This also applies to the rotation direction and the multiplexing direction.

By reading the code, information indicating how the recording positions are disposed on the disk can be obtained and thus recording position information can be read based on the obtained recording position format.

When, as shown in FIG. 2A, recording is performed such that the intervals between recording positions are constant, as shown in FIG. 1C, coordinate information for all recording positions may be held as recording position information. However, just because there is information indicating that "the intervals between recording positions are constant" as recording position format information, it does not necessitate holding of coordinate information for all recording positions as recording position information. As shown in FIG. 2B, it is only necessary to hold information about the intervals between recording positions, by which the recording position information can be compressed.

By thus using recording position format information, recording position information can be compressed according to a recording position format.

In the example, the attribute about the track direction, the rotation direction, and the multiplexing direction is represented using the upper two bits, and the type as to whether the intervals are constant or varying is represented using the lower two bits. However, the bit position, the number of bits, and the type are not limited thereto.

Fifth Embodiment

It will be described using FIGS. 9A and 9B that by a recording management method according to the present embodiment, upon recording data, recording positions can be defined whenever necessary and the recording positions can be managed.

Figure 9A:
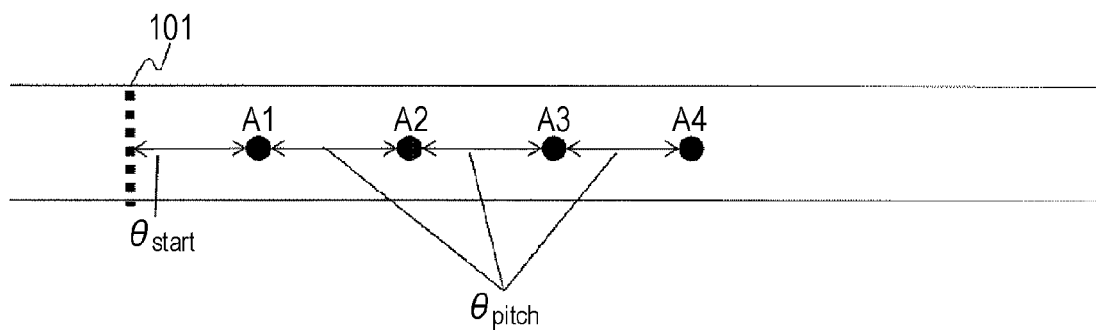
FIG. 9A is a schematic diagram of data recording positions on a disk.

FIG. 9A shows a state in which four recording positions are disposed on the same track on a disk at regular intervals of $\theta_{pitch}$, starting from a coordinate spaced $\theta_{start}$ from a reference position 101, and unique addresses (A1 to A4) are provided to the recording positions, respectively.

Figure 9B:
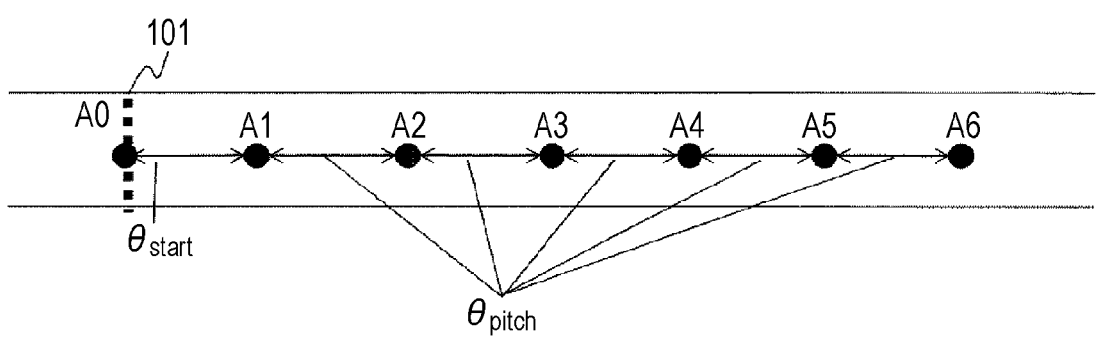
FIG. 9B is a schematic diagram of data recording positions on a disk.

FIG. 9B shows a state in which, from the state shown in FIG. 9A, recording positions provided with addresses A5 and A6 are further newly disposed at intervals of $\theta_{pitch}$ as with other recording positions, and a recording position for recording recording position format information and recording position information is disposed at the reference position 101 provided with an address A0.

A procedure will be described below for the case in which the information recording and reproducing apparatus 601 shown in FIG. 6 performs recording and reproduction of data in the disposition of recording positions shown in FIGS. 9A and 9B.

When the information recording and reproducing apparatus 601 receives an instruction for recording data at the addresses A1 to A4 from the external control apparatus 604, the recording position determining unit 602 determines a format in which the intervals are constant, as a recording position format and holds the format as recording position format information. In addition, the recording position determining unit 602 determines the coordinates of recording positions associated with the addresses A1 to A4. The address A1 is associated with a coordinate spaced $\theta_{start}$ from the reference position 101, and the addresses A2, A3, and A4 are determined to be disposed at regular intervals of $\theta_{pitch}$ from the coordinate associated with the address A1, which are held as recording position information. By the above-described procedure, the disposition of recording positions associated with the addresses A1 to A4 which is shown in FIG. 9A is achieved.

The recording and reproducing unit 603 obtains the coordinates associated with the addresses A1 to A4 from the recording position determining unit 602, and records data at the coordinates using the addresses A1 to A4 specified by the external control apparatus 604.

When the information recording and reproducing apparatus 601 receives an instruction for recording data at the addresses A5 and A6 from the external control apparatus 604, the recording position determining unit 602 determines the coordinates of recording positions associated with the addresses A5 and A6 which are disposed at regular intervals with other existing recording positions, and updates the held recording position information so as to include information about the association between the addresses and the coordinates for the added recording positions.

The recording and reproducing unit 603 performs recording at the coordinates associated with the addresses A5 and A6, using the recording position information generated by the recording position determining unit 602.

Here, it is assumed that the recording and reproducing unit 603 has recorded all recording data recordable on the same track by performing recording at the position A6. After completing the recording at A6, the recording and reproducing unit 603 records recording position format information and/or recording position information at A0 which is a first predetermined position.

After completing the recording of recordable recording data on the same track, or even if there is an unrecorded recordable area on the same track, when further recording is not performed on the track, the recording and reproducing unit 603 records recording position format information and/or recording position information at the first predetermined position A0 and/or a second predetermined position. By the above-described procedure, the disposition of recording positions shown in FIG. 9B is achieved.

As such, in a state in which recording position format information and/or recording position information about recorded data are not recorded on a disk, upon recording, recording positions can be defined whenever necessary, based on the held recording position format information and/or recording position information. By the recording position determining unit 602 updating the recording position information and recording, after completion of recording of data, recording position format information and/or recording position information, the recording positions can be managed.

This can also be applied to the case in which the disk is taken out of the information recording and reproducing apparatus once. When recording position format information and/or recording position information are/is not recorded on the disk, information about the recording positions of recorded data is obtained based on recording position format information and/or recording position information which are held in the information recording and reproducing apparatus 601, and then, the recording positions of data to be recorded next can be defined.

Alternatively, it is also possible to record, one by one, information on recording positions about recorded recording data. By this, for example, even if recording position information which is recorded at a predetermined position cannot be reproduced due to a flaw, etc., by integrating pieces of position information recorded at a plurality of locations, information about recording positions can be reconstructed.

Alternatively, in the case of a rewritable disk, recording position format information and/or recording position information which are recorded at the first predetermined position and/or the second predetermined position may be rewritten whenever necessary.

In addition, although in the present embodiment recording position format information and/or recording position information are recorded at the first predetermined position and/or the second predetermined position, those pieces of information may be recorded on a disk where data is recorded which is instructed by the external control apparatus 604, or may be recorded on a different disk than a disk where data is recorded.

Although the above-described example shows that new recording positions are added in a format in which the recording positions are disposed at regular intervals, the disposition format is not limited thereto and may be an irregular-interval disposition format. In addition, even in the case of a regular-interval disposition format, the disposition intervals between existing recording positions and the disposition intervals between recording positions to be added may be made different from each other. The disposition intervals may be selected according to, for example, the characteristics of each area of a disk or the reliability required for data to be recorded. For example, the disposition intervals may be determined according to the purpose, e.g., the disposition intervals for data whose reliability needs to be increased over normal data (e.g., recording position format information and/or recording position information) are set to be wider than those for the normal data so as to reduce interference with other data.

In addition, the above-described example shows the case in which, when the external control apparatus 604 requests to record data, recording positions are determined; however, the timing at which the recording positions are determined is not limited thereto. The disposition format, coordinates, and addresses of recording positions in some or all regions of a disk may be determined at a stage before the external control apparatus 604 requests to record data. For example, at timing before starting recording of data, the external control apparatus 604 may notify of the total amount of data to be recorded and a disposition format of recording positions. At that point in time, the information recording and reproducing apparatus 601 may perform disposition of the recording positions and assignment of addresses.

In addition, although the above-described example shows the case in which addresses specified by the external control apparatus 604 are directly provided to recording positions, the configuration is not limited thereto. For example, each recording position may be assigned a different address than an address specified by the external control apparatus 604, and the different address may be associated with the address specified by the external control apparatus 604.

Sixth Embodiment

It will be described that by a recording management method according to the present embodiment, in a state in which recording position format information and/or recording position information about recorded data are not recorded on a disk, the recorded data can be reproduced.

A procedure will be described for the case in which in a state in which data is recorded at the positions A1 to A4 in FIG. 9A and recording position format information and/or recording position information are/is not recorded at the position A0, the data recorded at the positions A1 to A4 is reproduced.

By an instruction for recording at A1 to A4 from the external control apparatus 604, the information recording and reproducing apparatus 601 performs reproduction. As described in the fifth embodiment, the recording position determining unit 602 generates and holds recording position format information and/or recording position information about the recording positions A1 to A4. In the case of a state in which these pieces of information are not recorded on the disk, the recording and reproducing unit 603 obtains and reproduces positions from the recording positions A1 to A4 by referring to the recording position format information and/or recording position information held in the recording position determining unit 602.

By this, even if the disk does not have information about the recording positions of recorded data, the recorded data can be reproduced based on the held recording position format information and/or recording position information, and the recording positions can be managed.

Figure 7:
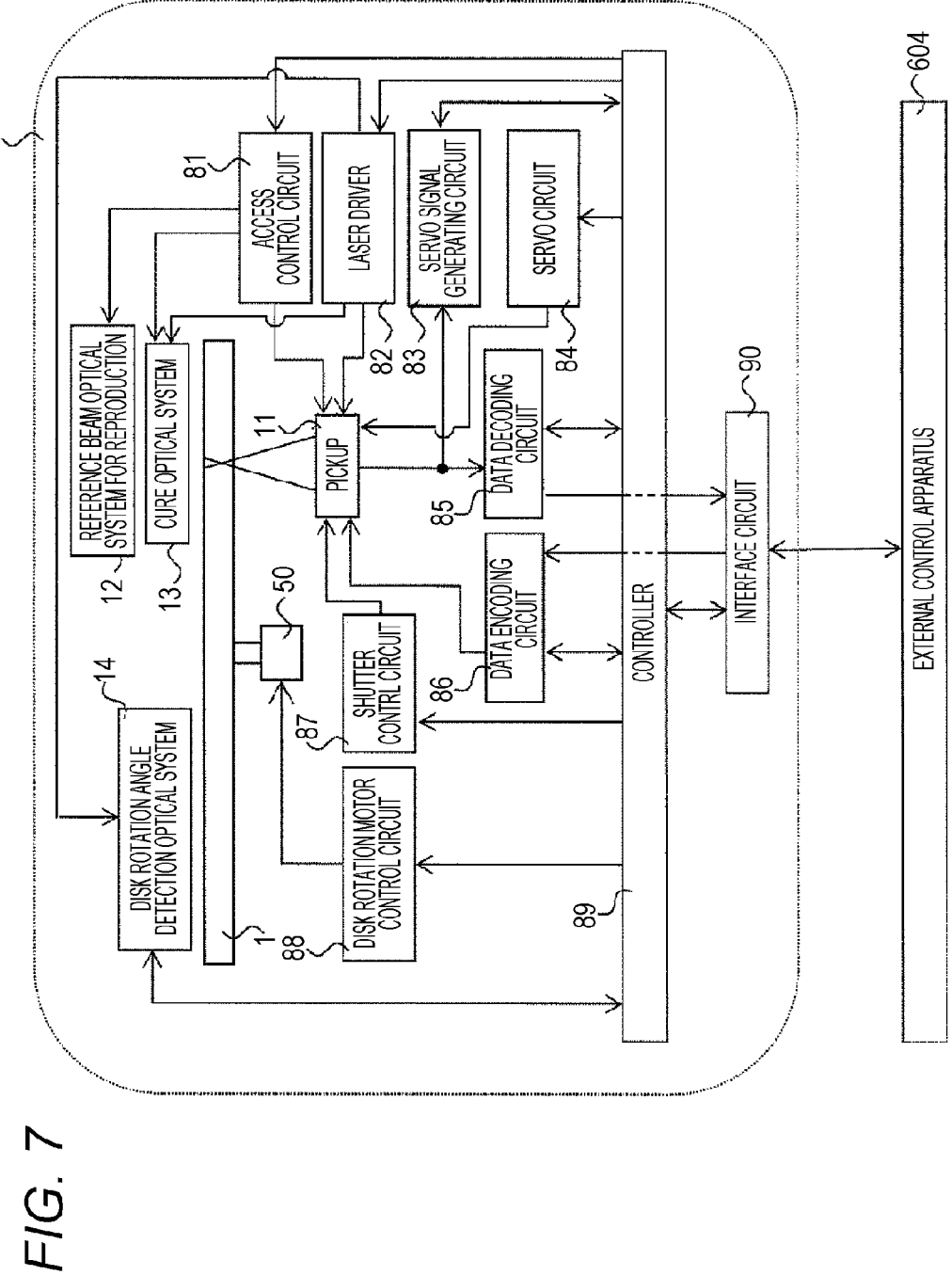
FIG. 7 is a schematic diagram showing the embodiment of the information recording and reproducing apparatus.

The recording and reproducing unit 603 of the information recording and reproducing apparatus 601 described in the above-described embodiments will be described in detail using FIG. 7. All of the embodiments described above can be implemented using apparatuses shown in FIGS. 6 and 7.

The recording and reproducing unit 603 is connected to the external control apparatus 604 through an interface circuit 90. When recording is performed, the recording and reproducing unit 603 receives, by the interface circuit 90, an information signal to be recorded, from the external control apparatus 604. When reproduction is performed, the recording and reproducing unit 603 transmits, by the interface circuit 90, a reproduced information signal to the external control apparatus 604.

The recording and reproducing unit 603 includes a pickup 11, a reference beam optical system for reproduction 12, a cure optical system 13, a disk rotation angle detection optical system 14, and a rotation motor 50. An optical information disk 1 is configured to be rotatable by the rotation motor 50.

The pickup 11 acts to irradiate the optical information disk 1 with a reference beam and a signal beam to record digital information on the disk 1 using holography. At this time, an information signal to be recorded is sent by a controller 89 to a spatial light modulator in the pickup 11 through a data encoding circuit 86, and the signal beam is modulated by the spatial light modulator.

When information recorded on the optical information disk 1 is reproduced, the reference beam optical system for reproduction 12 generates a lightwave which is allowed to enter the optical information disk 1 in the opposite direction to that for when a reference beam exiting from the pickup 11 is recorded. A reproduction beam which is reproduced by a reference beam is detected by a photodetector (described later) included in the pickup 11 and a signal is reproduced by a data decoding circuit 85.

The irradiation time of the reference beam and the signal beam with which the optical information disk 1 is irradiated can be adjusted by the controller 89 controlling the open/close time of a shutter in the pickup 11 through a shutter control circuit 87.

The cure optical system 13 acts to generate optical beams used for the pre-cure and post-cure of the optical information disk 1. The pre-cure refers to a previous process in which, when information is recorded at a desired position within the optical information disk 1, the desired position is irradiated with a predetermined optical beam in advance before the desired position is irradiated with a reference beam and a signal beam. The post-cure refers to a post-process in which, after information is recorded at the desired position within the optical information disk 1, the desired position is irradiated with a predetermined optical beam so as not to allow another writing at the desired position.

The disk rotation angle detection optical system 14 is used to detect a rotation angle of the optical information disk 1. When the optical information disk 1 is adjusted at a predetermined rotation angle, the disk rotation angle detection optical system 14 detects a signal generated according to a rotation angle and the controller 89 controls the rotation angle of the optical information disk 1 through a disk rotation motor control circuit 88 using the detected signal, by which the optical information disk 1 can be positioned at a targeted coordinate of a recording position defined in the embodiments.

Predetermined laser drive currents are supplied from a laser driver 82 to lasers in the pickup 11, the cure optical system 13, and the disk rotation angle detection optical system 14, and each laser or light-emitting diode can emit an optical beam of a predetermined amount.

In addition, the pickup 11 and the cure optical system 13 are provided with a mechanism for allowing the position thereof to slide in a radius direction of the optical information disk 1. Position control is performed through an access control circuit 81, by which the pickup 11 and the cure optical system 13 can be positioned at a targeted coordinate of a recording position defined in the embodiments.

Meanwhile, recording techniques using the principle of holographic angular multiplexing have a tendency that the allowance for the deviation of the angle of a reference beam is extremely small.

Therefore, it is necessary to provide, in the pickup 11, a mechanism for detecting the amount of deviation of the angle of a reference beam, generate a servo signal by a servo data encoding circuit 83, and provide, in the recording and reproducing unit 603, a servo mechanism for correcting the amount of deviation through a servo circuit 84.

In addition, for the pickup 11, the cure optical system 13, and the disk rotation angle detection optical system 14, some optical system components or all optical system components may be aggregated into a single unit for simplification.

In addition, for positioning of a disk at a recording position, movement in the radius direction and rotation control may be performed individually or may be performed simultaneously for fast positioning.

Note that the present invention is not limited to the above-described embodiments and includes various variants. For example, the above-described embodiments are described in detail to describe the present invention in an easy-to-understand manner, and thus, the present invention is not necessarily limited to one that includes all of the described configurations. In addition, some configurations of a given embodiment may be replaced with configurations of another embodiment, or configurations of a given embodiment may be added with configurations of another embodiment. In addition, for some configurations of each embodiment, addition, deletion, and replacement of other configurations may be made thereto.

In addition, some or all of the above-described configurations, functions, processing units, processing means, etc., may be implemented by hardware by, for example, designing an integrated circuit. Alternatively, the above-described configurations, functions, etc., may be implemented by software by a processor interpreting and executing a program that implements the functions. Information such as the program that implements the functions, tables, and files can be placed in a recording apparatus such as a memory, a hard disk, or an SSD or a disk such as an IC card, an SD card, or a DVD.

In addition, control lines and information lines that are considered to be necessary for description are shown and it does not necessarily mean that all control lines and information lines of a product are shown. It may be considered that in practice almost all components are connected to each other.

What is claimed is:

1. An information recording apparatus for a servo-layerless optical information disk, the information recording apparatus comprising:
    a recording position determining unit that determines a recording position format for all or some areas of the servo-layerless optical information disk from a plurality of recording position formats, determines a plurality of recording positions on the servo-layerless optical information disk as specified by the determined recording position format, and determines a plurality of addresses corresponding to the recording positions on the servo-layerless optical information disk as specified by the determined recording position format; and
    a recording and reproducing unit that records data at the determined recording positions on the servo-layerless optical information disk as specified by the determined recording position format, and records the determined recording position format at a predetermined position on the servo-layerless optical information disk,
        wherein each of the recording position formats respectively specifies a different plurality of recording positions and addresses corresponding thereto.

2. The information recording apparatus according to claim 1, wherein each of the recording position formats respectively specifies intervals between the different recording positions.

3. The information recording apparatus according to claim 1, wherein
    to reproduce the data at the recording positions, the recording and reproducing unit reproduces the recording position format recorded at the predetermined position on the servo-layerless optical information disk, the recording position determining unit determines the recording positions and the addresses specified by the reproduced recording position format, and the recording and reproducing unit reproduces the data at the recording positions.

4. The information recording apparatus according to claim 3,
    wherein the determined recording position format further specifies that intervals between the recording positions are constant, and wherein the determined recording position format recorded at the predetermined position further includes a recording start position of the determined recording positions.

5. The information recording apparatus according to claim 3,
wherein the determined recording position format further specifies that intervals between the recording positions are variable, and
wherein the determined recording position format recorded at the predetermined position further includes a recording start position of the determined recording positions from a reference position on the servo-layerless optical information disk.

6. An information recording method for a servo-layerless optical information disk, the information recording method comprising:
determining a recording position format from a plurality of recording position formats for all or some areas of the servo-layerless optical information disk;
determining a plurality of recording positions on the servo-layerless optical information disk as specified by the determined recording position format;
determining a plurality of addresses corresponding to the recording positions on the servo-layerless optical information disk as specified by the determined recording position format; and
recording data at the determined recording positions on the servo-layerless optical information disk as specified by the determined recording position format, and recording the determined recording position format at a predetermined position on the servo-layerless optical information disk.

7. The information recording method according to claim 6, further comprising:
obtaining the recording position format recorded at the predetermined position on the servo-layerless optical information disk; and
recording additional data at the recording positions on the servo-layerless optical information disk as specified by the obtained recording position format.

8. An information reproducing apparatus that reproduces information from a servo-layerless optical information disk, the information reproducing apparatus comprising:
a reproducing unit that reproduces information from the servo-layerless optical information disk; and
a control unit that controls the reproducing unit,
wherein a recording position format is recorded on the servo-layerless optical information disk at a predetermined position,
wherein the control unit controls the reproducing unit to obtain the recording position format, determine a plurality of recording positions on the servo-layerless optical information disk as specified by the obtained recording position format, determine a plurality of addresses for the determined recording positions as specified by the obtained recording position format, and reproduce the information from the servo-layerless optical information disk at the determined recording positions according to the determined addresses, and
wherein the recording position format includes four bits which specify the recording positions, where a first two bits represent a track direction, rotation direction or a multiplexing direction of the recording positions, and a second two bits represent that intervals between the recording positions are constant or variable.

9. An information reproducing method for reproducing information from a servo-layerless optical information disk where a recording position format is recorded on the servo-layerless optical information disk at a predetermined position, the method comprising:
obtaining the recording position format from the predetermined position of the servo-layerless optical information disk;
determining a plurality of recording positions on the servo-layerless optical information disk as specified by the obtained recording position format, and determining a plurality of addresses for the determined recording positions as specified by the obtained recording position format; and
reproducing the information from the servo-layerless optical information disk at the determined recording positions according to the determined addresses,
wherein the recording position format includes four bits which specify the recording positions, where a first two bits represent a track direction, rotation direction or a multiplexing direction of the recording positions, and a second two bits represent that intervals between the recording positions are constant or variable.

10. The information recording apparatus according to claim 1, wherein the determined recording position format recorded at the first predetermined position consists of four bits where a first two bits represent a track direction, rotation direction or a multiplexing direction of the recording positions, and a second two bits represent that intervals of the recording positions are constant or varying.

11. The information recording apparatus according to claim 10, wherein the determined recording position format specifies the intervals between the recording positions which are defined by a radial direction and a rotational angle.

12. The information recording method according to claim 6, wherein the determined recording position format recorded at the first predetermined position consists of four bits where a first two bits represent a track direction, rotation direction or a multiplexing direction of the recording positions, and a second two bits represent that intervals of the recording positions are constant or varying.

13. The information recording method according to claim 12, wherein the determined recording position format specifies the intervals between the recording positions which are defined by a radial direction and a rotational angle.

14. The information reproducing apparatus according to claim 8, wherein the determined recording position format specifies the intervals between the recording positions which are defined by a radial direction and a rotational angle.

15. The information reproducing method according to claim 9, wherein the determined recording position format specifies the intervals between the recording positions which are defined by a radial direction and a rotational angle.

* * * * *